(12) United States Patent
Sanghvi et al.

(10) Patent No.: US 7,899,903 B2
(45) Date of Patent: Mar. 1, 2011

(54) TEMPLATE BASED MANAGEMENT SYSTEM

(75) Inventors: Ashvinkumar J. Sanghvi, Sammamish, WA (US); Anand Lakshminarayanan, Redmond, WA (US); Chandika Bandari, Redmond, WA (US); Lorenzo Rizzi, Redmond, WA (US); Stephen O. Wilson, Redmond, WA (US); Travis A. Wright, Everett, WA (US); Vitaly V. Filimonov, Redmond, WA (US); Vitaly Voloshin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 11/241,584

(22) Filed: Sep. 30, 2005

(65) Prior Publication Data
US 2007/0093916 A1 Apr. 26, 2007

(51) Int. Cl.
*G06F 15/16* (2006.01)
(52) U.S. Cl. ........................................ 709/224; 709/221
(58) Field of Classification Search .................. 709/221, 709/224
See application file for complete search history.

(56) References Cited

U.S. PATENT DOCUMENTS

| | | | |
|---|---|---|---|
| 5,483,468 A | 1/1996 | Chen et al. | |
| 5,892,905 A | 4/1999 | Brandt et al. | 726/11 |
| 6,026,433 A * | 2/2000 | D'Arlach et al. | 709/217 |
| 6,205,413 B1 | 3/2001 | Bisdikian et al. | 703/24 |
| 6,272,537 B1 | 8/2001 | Kekic et al. | |
| 6,327,628 B1 * | 12/2001 | Anuff et al. | 719/311 |
| 6,336,138 B1 * | 1/2002 | Caswell et al. | 709/223 |
| 6,397,359 B1 * | 5/2002 | Chandra et al. | 714/712 |
| 6,412,026 B1 | 6/2002 | Graf | 710/18 |
| 6,606,658 B1 | 8/2003 | Uematsu | 709/225 |
| 6,615,198 B1 | 9/2003 | Aldrich | 706/47 |
| 6,738,813 B1 | 5/2004 | Reichman | 709/224 |
| 6,738,933 B2 | 5/2004 | Fraenkel et al. | |
| 6,898,597 B1 | 5/2005 | Cook et al. | 707/10 |
| 6,963,874 B2 | 11/2005 | Kasriel et al. | 707/10 |
| 7,062,511 B1 | 6/2006 | Poulsen | 707/104.1 |
| 7,409,447 B1 * | 8/2008 | Assadzadeh | 709/225 |
| 7,478,151 B1 * | 1/2009 | Maiocco et al. | 709/223 |
| 2002/0002443 A1 | 1/2002 | Ames et al. | 702/188 |
| 2002/0069271 A1 | 6/2002 | Tindal et al. | |
| 2002/0143920 A1* | 10/2002 | Dev et al. | 709/223 |
| 2003/0036886 A1* | 2/2003 | Stone | 702/188 |
| 2003/0120599 A1 | 6/2003 | Agboatwalla et al. | 705/50 |

(Continued)

OTHER PUBLICATIONS

PCT Search Report, PCT/US2006/038527, mailed Feb. 2, 2007.

(Continued)

*Primary Examiner*—William C Vaughn, Jr.
*Assistant Examiner*—Boris Gorney
(74) *Attorney, Agent, or Firm*—Joseph R. Kelly; Westman, Chanplin & Kelly, P.A.

(57) ABSTRACT

One embodiment of the invention uses templates that define certain features of a given service type, wherein the features are common to all services of that service type. The template can be configured by a user to obtain a service definition for the given service. The service definition is passed to a programmability layer and provides enough information that the programmability layer can construct the various monitors, rules, classes and tasks required to monitor the given service without further customization by the user. In one embodiment, the user can also customize the service definition, a desired, in order to obtain additional monitoring.

11 Claims, 13 Drawing Sheets

U.S. PATENT DOCUMENTS

| | | | |
|---|---|---|---|
| 2003/0126240 A1* | 7/2003 | Vosseler | 709/221 |
| 2003/0130982 A1* | 7/2003 | Kasriel et al. | 707/1 |
| 2003/0154279 A1* | 8/2003 | Aziz | 709/225 |
| 2004/0039805 A1 | 2/2004 | Connelly et al. | 709/223 |
| 2004/0255160 A1 | 12/2004 | Stamos et al. | 713/201 |
| 2005/0015624 A1 | 1/2005 | Ginter et al. | 713/201 |
| 2005/0188269 A1 | 8/2005 | El-Shimi et al. | 714/38 |
| 2005/0228880 A1* | 10/2005 | Champlin | 709/224 |
| 2005/0289232 A1* | 12/2005 | Ebert | 709/224 |
| 2006/0031481 A1* | 2/2006 | Patrick et al. | 709/224 |

OTHER PUBLICATIONS

U.S. Appl. No. 11/241,65, filed Sep. 30, 2005.
Microsoft Operations Manager 2005: Reporting Overview Sep. 20, 2005, 5 pages.
Logcaster; Use RippleResults Management Templates to Manage Windows Applications and Components with Ease (2005) Sep. 20, 2005. 2 pages.
MointorMagic Features Overview (1 price-all modules); Reporting (2005) Sep. 20, 2005 4 pages.
Event Tracker; Complete Event Management (2005) Sep. 20, 2005 5 pages.
Chinese Patent Application No. 200680035789.8, Second Office Action, Date of Dispatch Feb. 5, 2010.
Chinese Application No. 200680035789.8, First Office Action dated Jun. 5, 2009 (translation).
U.S. Appl. No. 11/241,651 Office Action dated Nov. 17, 2009.
U.S. Appl. No. 11/241,651 Office Action dated Apr. 29, 2009.
U.S. Appl. No. 11/241,651 Office Action dated Jul. 14, 2009.
U.S. Appl. No. 11/241,651 Office Action dated Oct. 29, 2008.
U.S. Appl. No. 11/241,651 Office Action dated Jun. 24, 2010.
Chinese Patent Application No. 200680035789.8, dated Jun. 9, 2010.
Russian Patent Application No. 2008112132 Office Action dated Jul. 22, 2010. 8 pages.
Chinese Patent Application No. 200680035789.8 Fourth Office Action dated Sep. 7, 2010.

* cited by examiner

TEMPLATE BASED MANAGEMENT SYSTEM

BACKGROUND

It is currently quite common for services (such as software applications, hardware devices, web services, database applications, web pages, web sites, etc.) to be monitored by a monitoring system. Monitoring systems take a wide variety of different forms, and monitor a wide variety of different things. For instance, some monitoring systems monitor the state of a service, such as whether the service is running, stopped, or has been abnormally terminated. Other monitoring systems monitor the health of services in terms of certain performance criteria. For instance, some monitors monitor the amount of memory that a service is using, or the processor capacity being used by the service, or other similar criteria.

Performing these types of monitoring of services requires knowledge of the components of a service, the dependencies of the service, and the behavior of the service. The definition of these constructs is complex, and often only comprehensible by engineers or other technical personnel who were involved in the design of the service.

Similarly, the different types of services that businesses expect to monitor are evolving in complexity, and include distributed services, as well as redundant and multi-tier architectures. These factors contribute to making the task of configuring monitoring for these types of services more and more complex.

Similarly, business applications and business solutions are currently being widely deployed. Such solutions, however, can be unique, or customized to the different users which use them. Therefore, current systems are only able to monitor such solutions by building custom monitoring logic. In order to effectively monitor a given service, a number of high-level questions must often be addressed. Examples of some of those questions (which may or may not need to be answered) are as follows:

What does the service look like?
What components is the service made of and how do the service components interact?
What infrastructure services does the service in question depend on?
How do we find the deployments of the service in a network?
How do we differentiate two deployments of the given service?
What attributes of the service are of interest to the user?
What instrumentation data should be collected about the service?
How should the data be formatted and displayed to be useful to the service administrator?
What are common tasks users perform on the service?
How does an administrator know if the service is performing as designed?
What are the issues that can affect the service's ability to function?
How can such issues be detected, or better still, prevented?
What data should be collected to diagnose the issues?
Are there any corrective actions that can be performed in response to such issues?
When should the administrator be notified of possible issues?
What data should be provided to the administrator as context to understand and troubleshoot a possible issue?

These are just some common high level questions that may be used to guide the design of a monitoring solution for a given service. It will also be noted that each of these questions may lead to another level of detail, in which additional questions must be answered. The complexity associated with answering these questions in sufficient detail so that a monitoring system can function often surpasses the complexity that users of the solutions (or administrators of the solutions) can grasp.

Thus, companies face difficulties in obtaining adequate monitoring of their customized business solutions. The task may require it to be outsourced, which increases cost, and can be cumbersome to integrate.

The discussion above is merely provided for general background information and is not intended to be used as an aid in determining the scope of the claimed subject matter.

SUMMARY

One embodiment of the invention uses templates that define certain monitoring characteristics of a given service type, wherein the characteristics are common to all services of that service type. The template can be configured by a user to obtain a service definition for the given service. The service definition is passed to a programmability layer and provides enough information that the programmability layer can construct the various monitors, rules, classes, views and tasks required to monitor the given service without further customization by the user. In one embodiment, the user can also customize the service definition, as desired, in order to obtain additional monitoring.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter

DETAILED DESCRIPTION

The present invention relates generally to using templates to configure a description of a service to be monitored. However, before describing the present invention in more detail, one illustrative environment in which the present invention can be used will be described.

Figure 1:
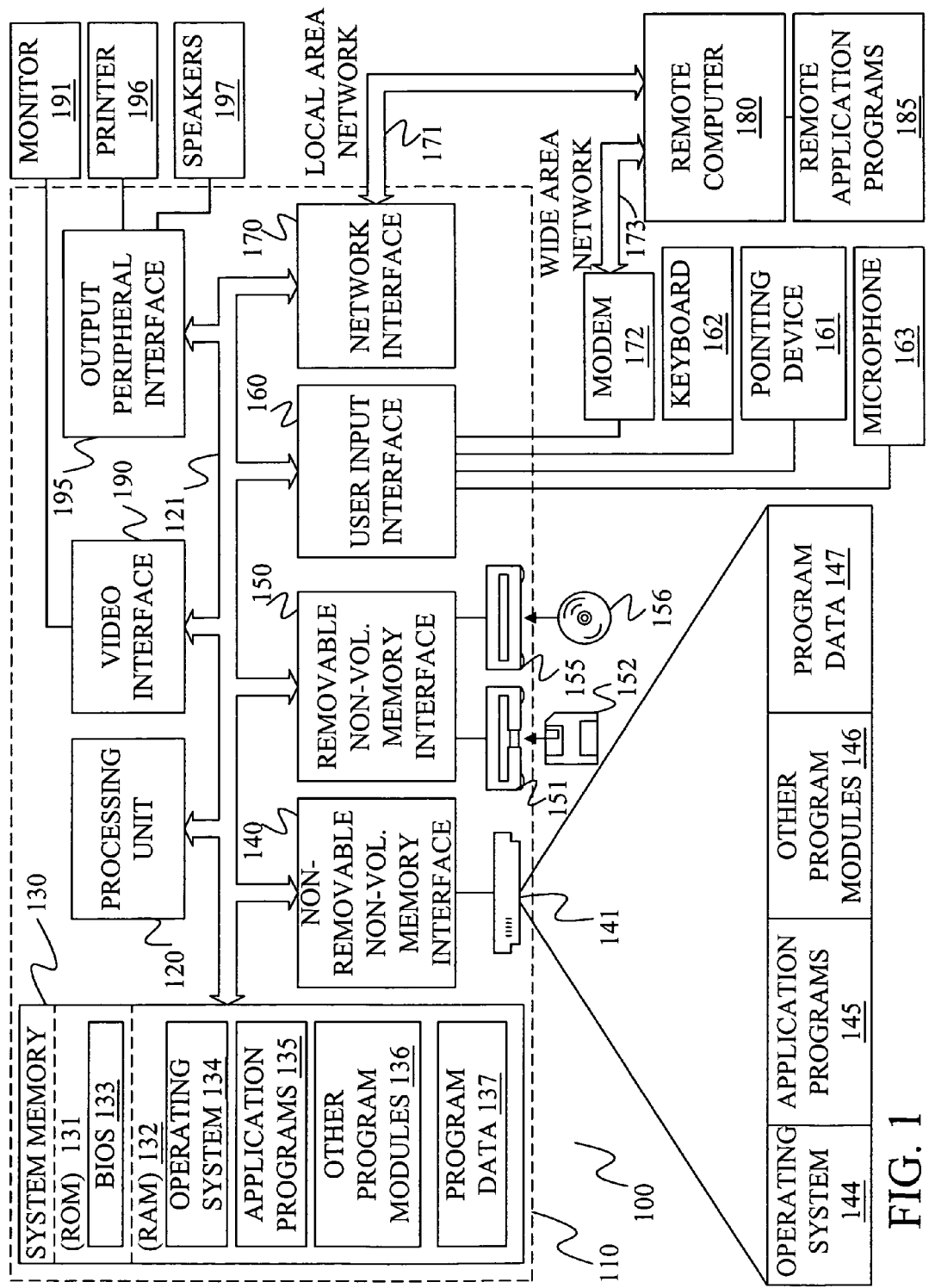
FIG. 1 is one illustrative environment in which the present invention can be used.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
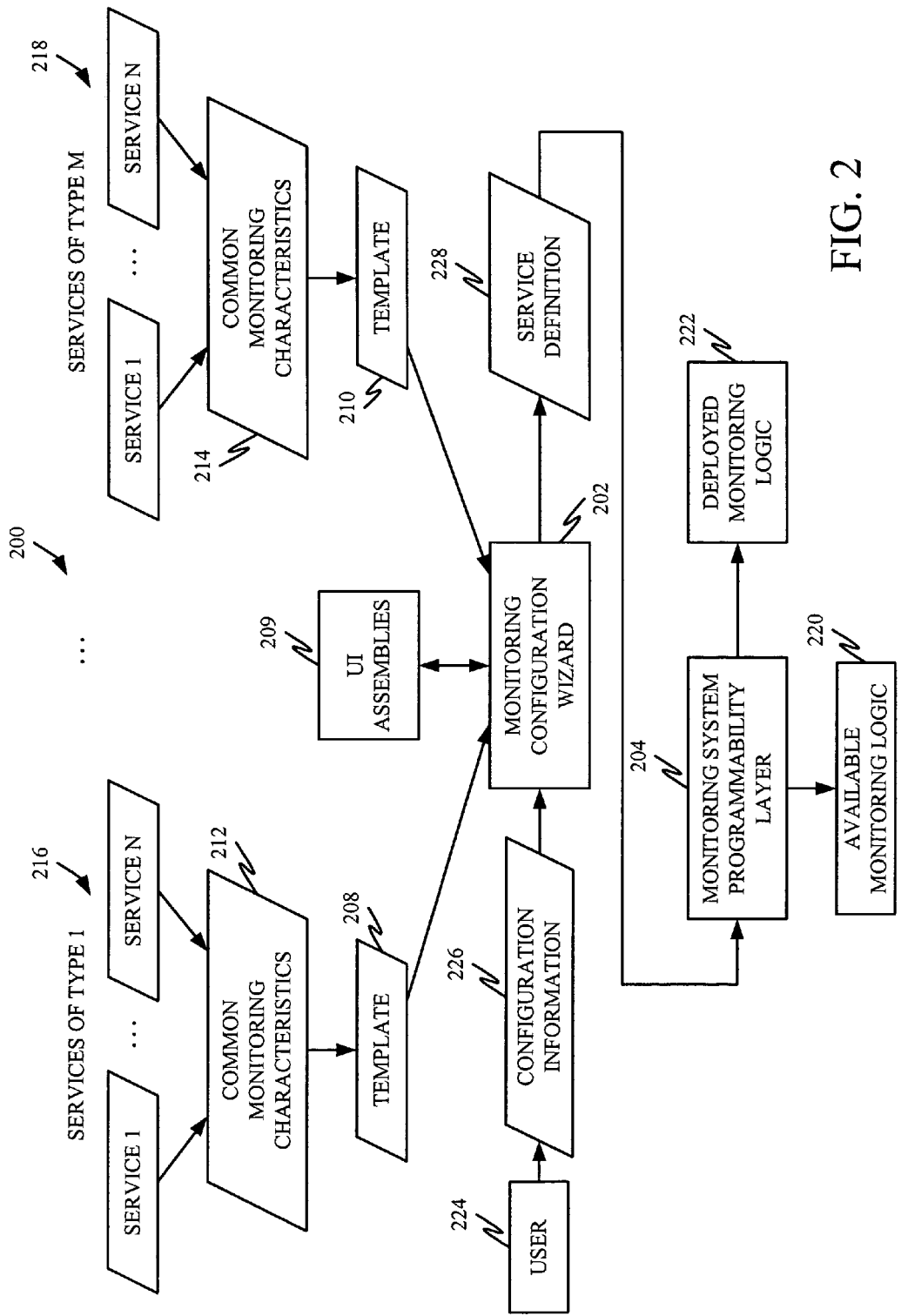
FIG. 2 is a block diagram of one embodiment of a template framework.

FIG. 2 is a block diagram of a template framework 200 in accordance with one embodiment. Template framework 200 includes monitoring configuration wizard 202 and monitoring system programmability layer 204. Wizard 202 is shown accessing templates 208 and 210 each of which are generated from a set of common characteristics 212 and 214, respectively, from services of a different service type. Template 208 is shown as being based on characteristics 212 from services of a first service type (collectively referred to by numeral 216), and template 210 is shown as being based on characteristics 214 from services of a second service type (collectively referred to by numeral 218).

Configuration wizard 202 is shown receiving configuration information 226 from user 224 and accessing UI assemblies 209 which are UI displays corresponding to templates 208 and 210. As is described in greater detail below, configuration wizard 202 generates a service definition 228 from a selected template 208 or 210 (selected by the user) and based on configuration information 226 provided by the user.

Monitoring system programmability layer 204 is shown receiving service definition 228 and accessing available monitoring logic 220. Based on the service definition 228, programmability layer 204 generates monitoring logic 222 which is deployed to monitor a given service.

Figure 3A:
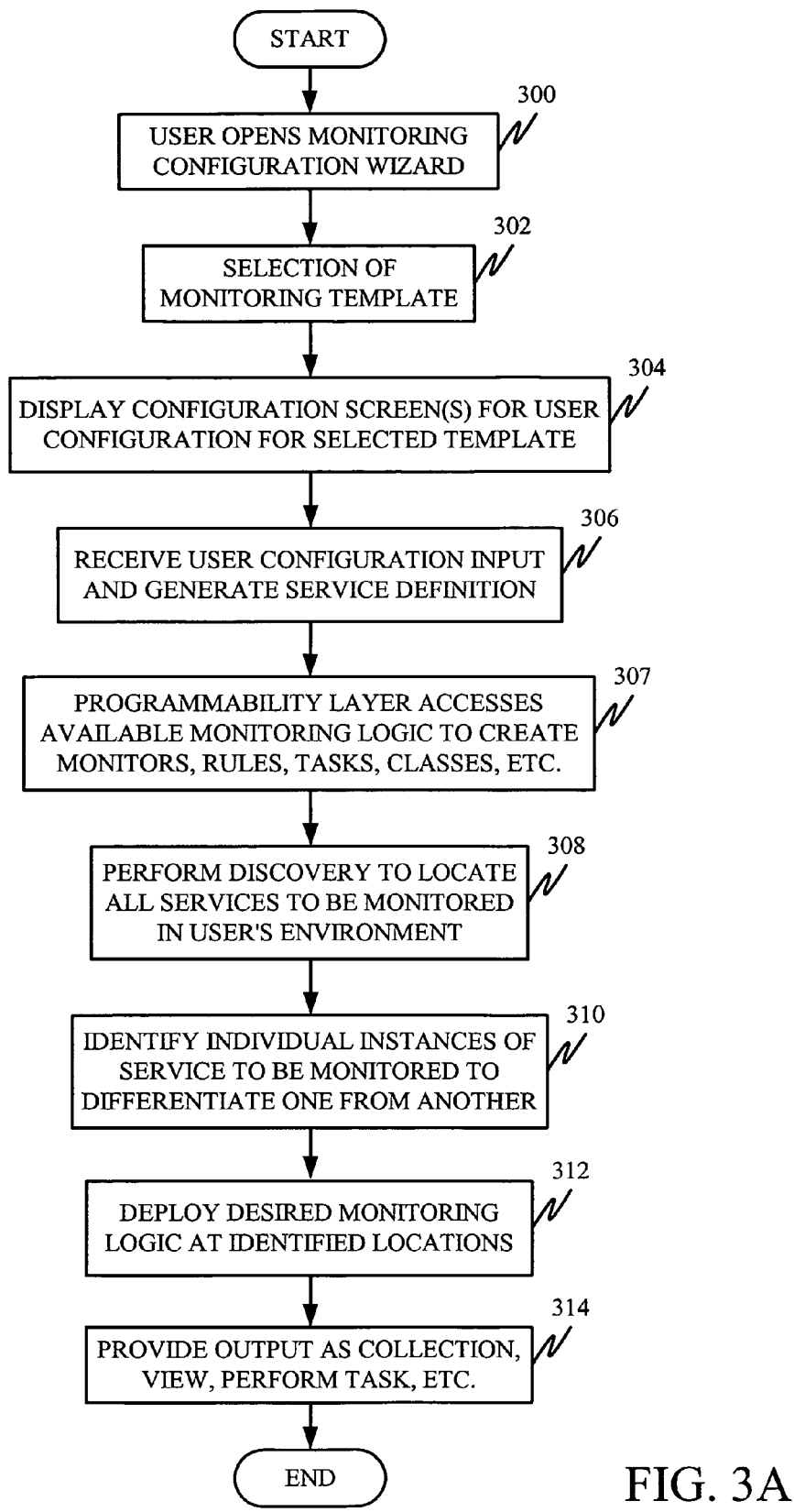
FIG. 3A is a flow diagram illustrating one embodiment of the operation of the template framework shown in FIG. 2.

FIG. 3A is a flow diagram illustrating the operation of framework 200, shown in FIG. 2, in greater detail. However, prior to discussing operation of framework 200, templates 212 and 214 will be discussed. Each of the templates is derived by grouping services to be monitored into groups of service types. Services of a first type are indicated by numeral 216 and services of a second type are indicated by numeral 218. Each of the services have common monitoring characteristics. For instances, the services of the first type, 216, have common monitoring characteristics 212, while the services of the second type, 218, have common monitoring characteristics 214. Template 208 is generated based on the common monitoring in characteristics 212 of the services of the first type 216. Template 210 is generated from the common monitoring characteristics 214 of the services of the second type 218.

While the common characteristics of a group of services can be obtained using a wide variety of different means, one illustrative means is by using the type inheritance for the group of services. For instance, FIG. 3C illustrates the type inheritance for a specific operating system service 400. Service 400, as can be seen by the type inheritance, is an operating system (OS) local application 402. OS local application 402 is a system local application 404, which is, itself, a system application 406. System application 406 is a system ManagedEntity 408. Thus, FIG. 3C shows that the specific OS service 400 has a set of monitoring configuration characteristics 410. Therefore, in one embodiment, each of the various templates 208 and 210 has an associated set of common monitoring characteristics which can be obtained by the type inheritance for the type of service represented by the template.

That being the case, in order to generate and deploy monitoring logic for a given service, the user 224 first provides an input to open monitoring configuration wizard 202. This is indicated by block 300 in FIG. 3A. When configuration wizard 202 is opened, it generates user interface displays to walk the user through configuring monitoring using the configuration wizard 202.

One exemplary set of user interface displays is indicated by block 3B. When configuration wizard 202 is first opened, it may illustratively generate a static welcome display, such as display 350 in FIG. 3B. It can be seen that the static display may illustratively display a welcome message and provide user actuable elements, such as the "Next" buttons located along the bottom of display 250, to allow the user to advance to a next screen. The static display is static because it does not change, regardless of which templates are configurable with the configuration wizard 202.

Figure 3B:
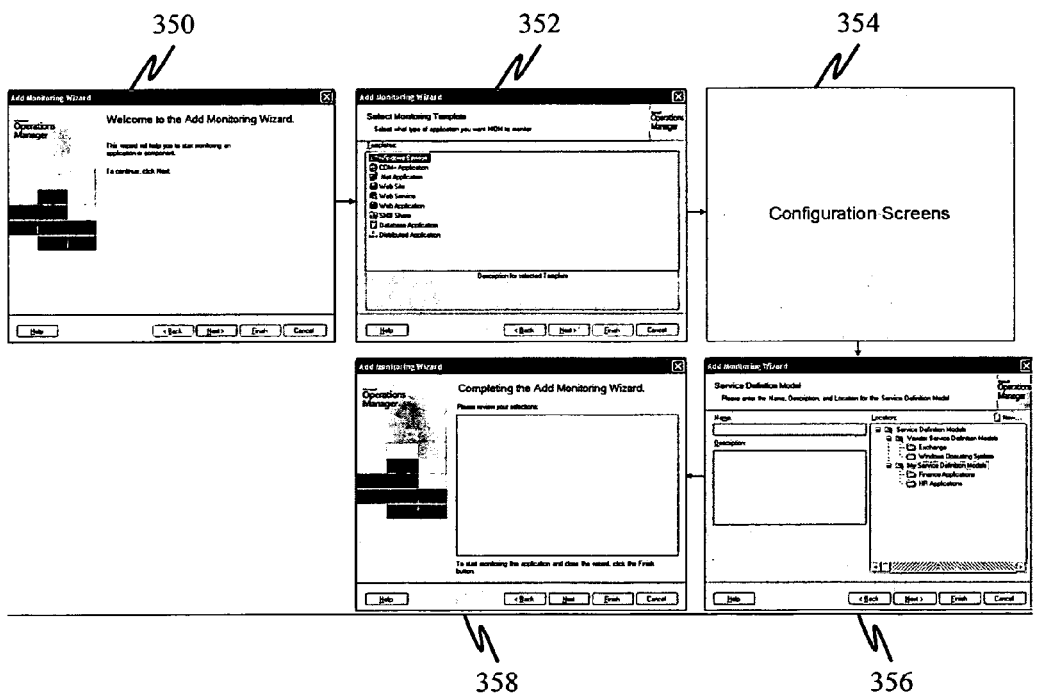
FIG. 3B illustrates one embodiment of a set of user interface pages used to configure a template to obtain a service definition.
Figure 3C:
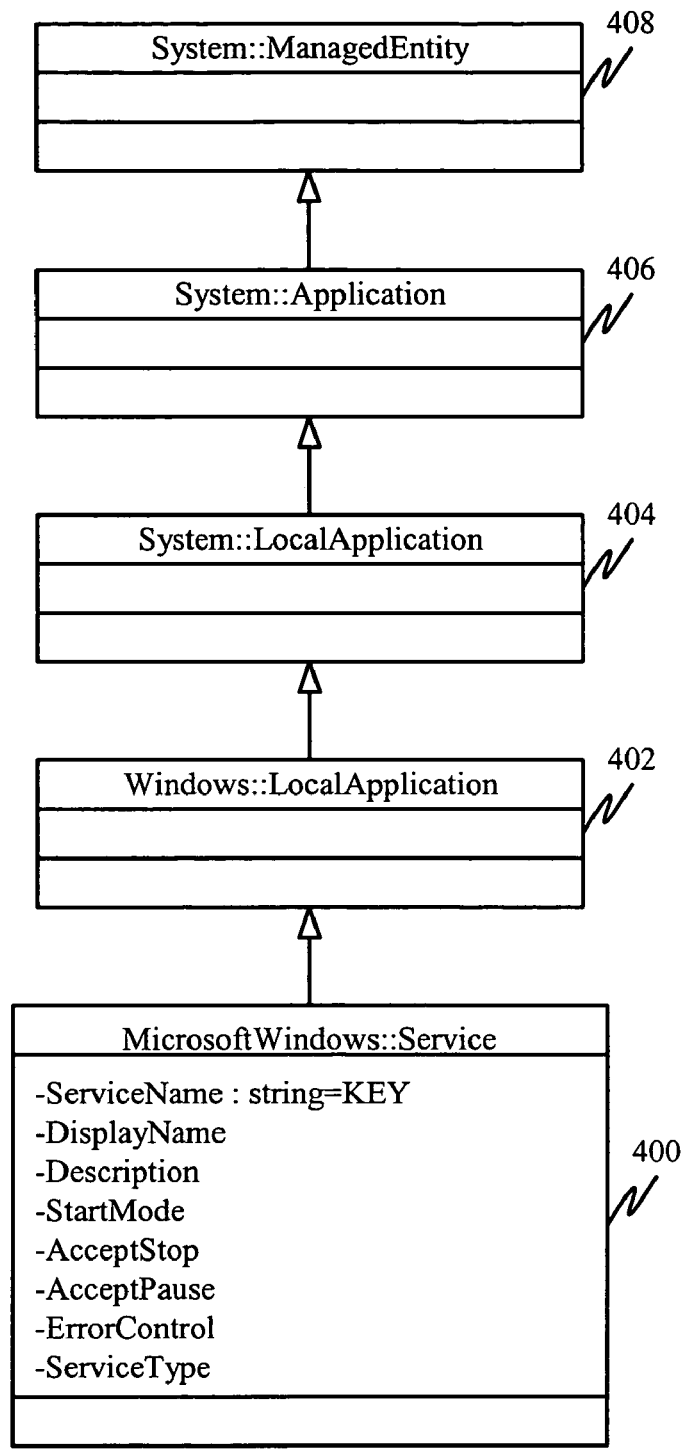
FIG. 3C illustrates one embodiment of a type inheritance indicating monitoring characteristics of a given feature.

The user then advances to a template selection screen, such as that shown at block 352 in FIG. 3B. As can be seen, block 352 provides a list of available templates which serve as a starting point in generating a service definition to configure monitoring for a given service. The list of templates shown in UI display 352 includes templates corresponding to an operating system service, a com+ application, an number of applications, a website, a web service, a web application, a database application and a distributed application. The various templates displayed in display 352 represent the available templates 208-210 (from FIG. 2) that are available for selection by the user. The templates in display 352 represent only a representative list of templates and others could be provided as well.

The user simply selects one of the monitoring templates displayed to the user, such as on user interface display 352. Selection of a monitoring template is indicated by block 302 in FIG. 3A. This can be done in a wide variety of ways, such as by highlighting the desired template and clicking "Next", or double clicking on the selected template, etc.

Once the user has selected the monitoring template, monitoring configuration wizard 202 accesses UI assemblies 209 and obtains a UI page set in an assembly corresponding to the selected template. The UI pages in the UI page set are displayed as configuration screens 354 (shown in FIG. 3B) and allow a user to enter configuration information 226 which is used to further configure the monitoring functions represented by the selected template. For instance, the template may allow the user to turn on or off a variety of different monitoring options, or to set threshold levels for system performance criteria, etc. Displaying the configuration screens for user configuration of the selected template is indicated by block 304 in FIG. 3A.

The user then provides configuration information 226 to configuration wizard 202 and wizard 202 generates service definition 228. This is indicated by block 306 in FIG. 3A.

Figure 3D:
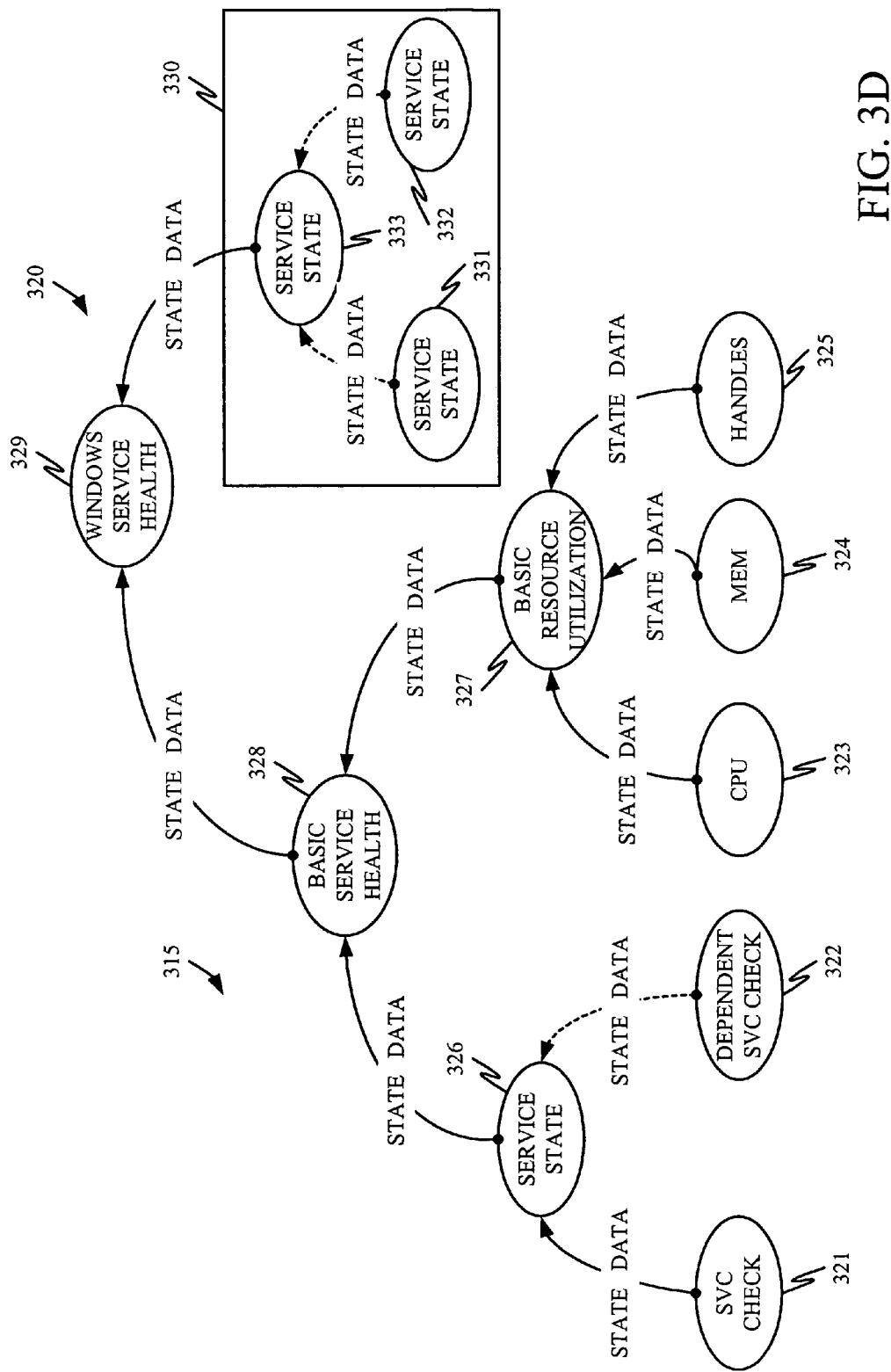
FIG. 3D illustrates one embodiment of a health model which can be generated by a template author.

The configuration screens 354 may also illustratively allow a user to add customized monitoring as well. FIG. 3D illustrates one exemplary embodiment of a health model which may be represented by a template and configured and customized by a user through configuration screens 354. This exemplary model 320 will now be described to enhance understanding of the remainder of the discussion.

The health model 320 illustratively includes a first model portion 315 and a second model portion 330. The first model portion 315 is illustratively monitoring that is predefined and represented by the selected template and which may be configured by the user through configuration screens 354. The second model portion 330 is illustratively a customized monitor configuration input by the user through configuration screens.

First model portion 315 illustratively includes a plurality of monitors 321-325, all of which monitor a different item. Model 320 further includes roll-up monitors 326-329 which roll up the results of lower level monitors 321-325. In the embodiment shown in FIG. 3D, monitors 321-325 include a service check monitor 321 which simply checks the state of the service (i.e., whether it is running, stopped, or has been abnormally terminated). The monitors also include a dependant service check monitor 322 which monitors the state of dependent services. Monitors 323-325 are resource utilization monitors that monitor the usage of the processor, memory, and handles, respectively. The information from these monitors is rolled up by roll up monitors 326 and 327 which implement rules to provide state information to a basic health service roll up monitor 328 that indicates whether the basic monitored criteria or characteristics (monitored by monitors 321-325) have met or exceeded a given threshold. Basic health service roll up monitor 328, in turn, provides state data to service health monitor 329 based on the inputs from roll up monitors 326 and 327.

FIG. 3D also shows that the second model portion 330 of health service model 320 includes a customized instrumentation monitor configuration. Monitor configuration 330 includes a pair of customized monitors 331 and 332 which monitor advanced (not basic) characteristics or criteria that are rolled up into an advanced health service monitor 333. The customized monitors may monitor customized instrumentation in the monitored service. For instance, monitor 331 may illustratively be an events monitor that monitors customized instrumentation events which bear on the advanced health of the service being monitored. Similarly, numeric data monitor 332 may illustratively monitor any type of numeric data generated by monitored instrumentation (such as a number of security related events). The data from monitors 331 and 332 is rolled up by monitor 333 and provided to service health monitor 329 which provides an output indicative of the overall health of the monitored service. In one illustrative embodiment, the customized instrumentation monitoring configuration in model portion 330 is configured by the user's configuration information 226, which is input through the configuration screens 354 corresponding to the selected templates.

In any case, once all of the user configure information 226 is input to configuration wizard 202, configuration wizard 202 generates service definition 228 as indicated by block 306 in FIG. 3.

Configuration wizard 202 may then illustratively provide additional screens to the user, such as UI screen 356 in FIG. 3B which prompt the user for the name, description and location for the service definition 228. This allows the user to specifically name, and store, the service definition 228 at a given location.

Finally, configuration wizard 202 can provide a final review screen 358 (if FIG. 3B) which allows the user to review all of the configuration information which has been input, and the service definition 228 created. Of course, a wide variety of other or different user interface screens can be provided, as desired.

It can be seen that a large number of the questions posed in the background portion of the application can illustratively be automatically answered based on the type inheritance for the type of service the user wishes to monitor, and thus based on the template chosen by the user.

Once the service definition has been formed, it is passed to monitoring programmability layer 204. Programmability layer 204 then accesses available monitoring logic 220 and creates the monitors, rules, tasks, views, classes, etc. which are required to monitor the service defined by service definition 228. This information is illustratively stored in a data store accessible by layer 204. This is indicated by block 307 in FIG. 3A.

Once the service definition 228 has been generated and the monitor logic created, programmability layer 204 performs discovery to locate all services to be monitored in the user's environment. For instance, once the service definition 228 has been generated, programmability layer 204 must examine each machine in the user's environment to determine whether it is running a monitoring framework 200 and whether it has the specific service which the user wants to monitor. The user's environment may include a single machine, an intranet or other network of machines and might also include servers, mobile devices, portable computers, computing devices on a wireless network, etc. Programmability layer 204 thus determines whether it needs to apply the monitoring logic or policies associated with the service definition to a given machine.

For instance, assume that the service to be monitored is an anti-virus application. Assume also that a given machine in the user's environment of machines hosts the anti-virus application. In that case, programmability layer 204 identifies the machine that hosts that anti-virus application and applies the monitoring policies associated with the service definition 228 to that machine. This can be accomplished in a wide variety of different ways. In one embodiment, programmability layer 204 transmits a discovery rule to each of the machines in the user's environment that are being monitored by the monitoring system. Those machines receive the discovery rule and run the discovery rule on a periodic basis to look to see whether the specific service (in this case, the anti-virus application) exists on that machine. When the service does exist on that machine, then the monitoring policies required to monitor that service, as described in service definition 228, are provided to that machine so that the desired service monitoring can be implemented. Performing discovery is indicated by block 308 in FIG. 3A.

Having performed discovery and identified the machines on which the service to be monitored is running, programmability layer 204 then identifies individual instances of the service to be monitored to differentiate one of the instances from another. In other words, if a machine is running two instances of the same service, those two instances must be differentiated. In one embodiment, this is performed by using identity information in the template selected by the user. The template illustratively includes an identity or key properties (such as the service name within a computer and the machine name for multiple-computer implementations) that will successfully identify each instance of the service to be monitored. This will illustratively be performed by the template selected by the user. Identifying the individual instances is indicated by block 310 in FIG. 3A.

Once the locations and individual instances of the service to be monitored are identified, monitoring system programmability layer 204 then deploys the created monitors, rules, views, etc., on the identified machines, in order to monitor the services. This is indicated by block 312 in FIG. 3A.

The deployed monitoring logic 222 can then provide various outputs. For instance, the outputs can be as views which show the performance of the monitored service in different ways. The views may for instance show the performance of the monitored service with respect to memory usage over time. Of course, a wide variety of other different views can be used as well. Similarly, the deployed monitoring logic 222 can generate collections. Collections are obtained by executing rules associated with events that are to be collected, stored in a database and later reported on. For instance, it may be desirable for the monitoring logic to collect security related events that the user wishes to log and generate a report on at a later time.

The monitoring logic 222 and programmability layer 204 may also, in conjunction with configuration wizard 202, perform tasks. For instance, a task may allow a user to restart the service, once it has been stopped. Providing the outputs is indicated by block 314 in FIG. 3A.

Programmability layer 204 also provides programmability support for the templates. For instance, programmability layer 204 allows one to manage the templates by generating a collection of templates, enumerating templates, obtaining identifiers for templates, and executing the templates.

It will be noted that, in one embodiment, each template has a default policy. The configuration applied by default, for example, to the health modeling may include default thresholds. In other words, in the resource utilization portion of health modeling, there may be threshold values associated with the amount of memory used, the amount of processor capacity used, etc. by the service being monitored. The monitors of those values may be performance counters. If the performance counters exceed the thresholds, then the state information in the monitor changes. Of course, in another embodiment, the user is allowed to change the default values as well.

Figure 4:
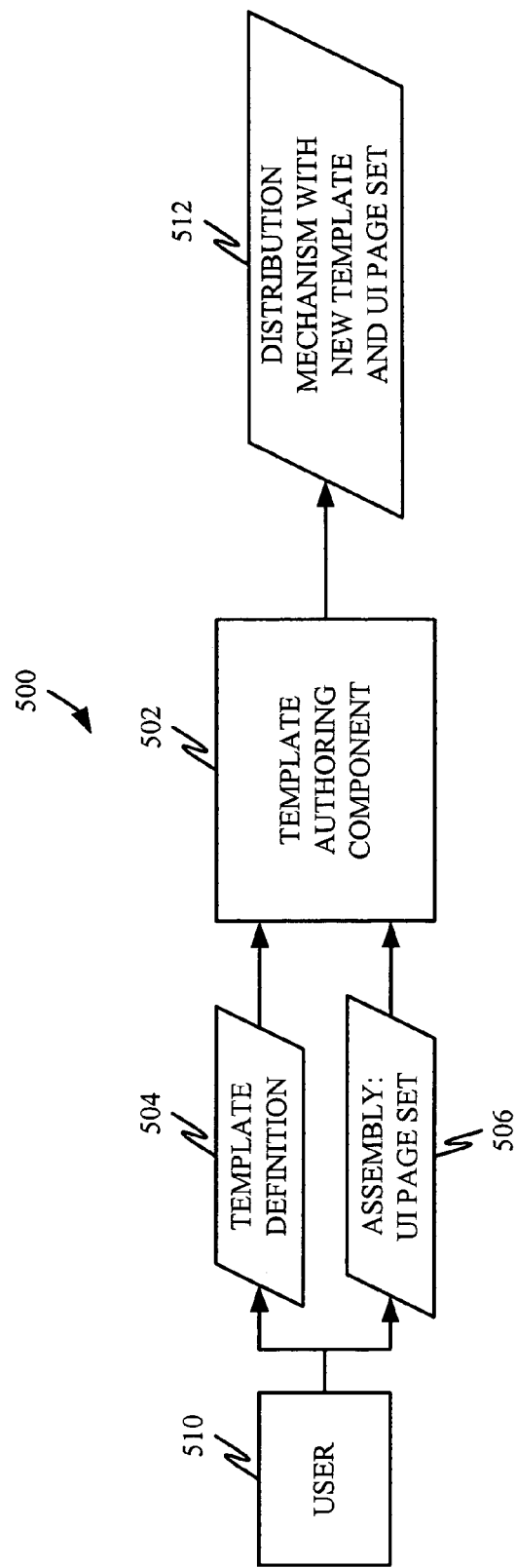
FIG. 4 is a block diagram of a template authoring environment in accordance with one embodiment.

FIG. 4 is a block diagram of a template authoring environment 500 in accordance with one embodiment of the invention. Template authoring environment 500 includes template authoring component 502 that receives from an author 510 a template definition 504 along with an assembly which includes a user interface page set 506. The template authoring component 502 generates the template and inserts it, along with the assembly 506, into a distribution mechanism, such as a management pack, as indicated by numeral 512.

Figure 5:
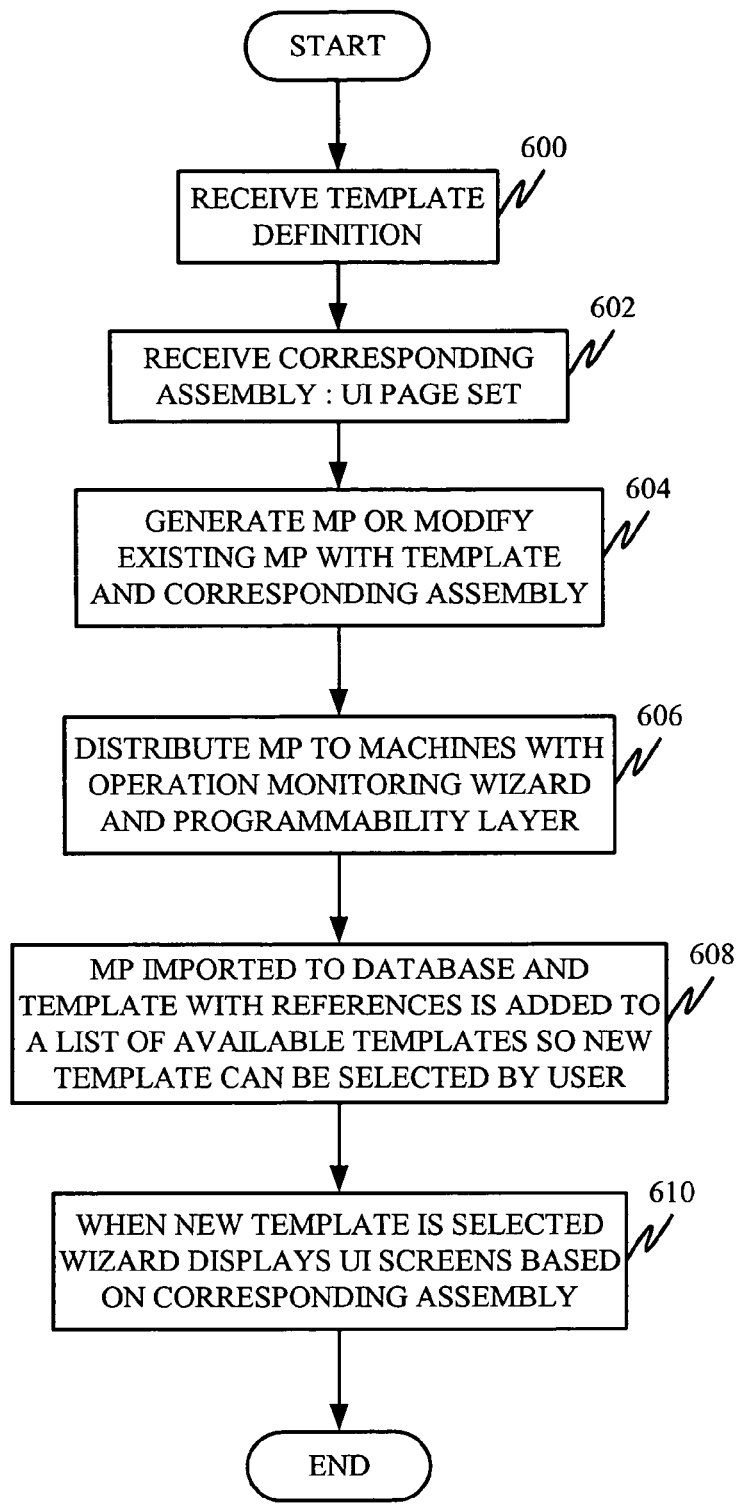
FIG. 5 is a flow diagram illustrating how templates are authored using the system shown in FIG. 4, in accordance with one embodiment.

FIG. 5 is a flow diagram better illustrating the operation of environment 500 in generating a distribution mechanism. The distribution mechanisms can be any of a variety of different mechanisms, and the one described herein for the sake of example is a management pack. As described above, a template is basically a predefined set of monitoring that is configured by the customer entering some set of configuration information. First, the author generates a template definition. This is indicated by block 600 in FIG. 5. In one embodiment, in order to generate a template definition 504, three things are needed: configuration information, references and implementation information. The configuration information is illustratively information that specifies the configuration values that will be entered by the user and used in the implementation section. The references are a list of references that will be created in the management pack that the template output is stored in. The implementation section is, itself, a management pack fragment that has substitution parameters embedded in it. These parameters refer to the configuration section of the template. For example, if the element ServiceName is required as part of the configuration, this can be used in the implementation section as $config/ServiceName$. Then, when the template is run, this value is replaced with the actual value of ServiceName.

The first step in creating the template definition 504 is to create the management pack elements required (such as classes, monitors, rules, etc.) as a valid stand alone management pack. The functionality is tested and updated as desired and a template is created from the management pack and inserted into the templates section of the management pack that will eventually contain the template. The configuration information that will be required for the template is then defined and the configuration parameters are substituted where required in the template. The template can then be run and the output tested.

Template authoring component 502 illustratively provides this step-by-step approach to author 510 in generating template definition 504. The steps for generating the template definition are described in greater detail below with respect to FIG. 6.

The author then generates the corresponding assembly which includes a user interface page set that will be displayed to the user as configuration pages 354 (shown in FIG. 3B) when the template is selected by the user. This is indicated by block 602 in FIG. 5. The UI page set can be generated in a number of different ways. For instance, a management pack may contain one or more reusable UI page definitions that can be configured as the UI page set. An example of a UI page definition is illustrated below in Table 1.

TABLE 1

```
<UIPages>
    <!-- UI page that allows the user to browse to a
machine and select
        a windows performance counter and their
instances.
        Inputs: None (all inputs to this page
are ignored)
        Output Sample:      <ComputerName/>
                            <CounterName>% Disk
Time</CounterName>
<ObjectName>PhysicalDisk</ObjectName>
                            <InstanceName/>
    <AllInstances>true</AllInstances>
    <Frequency>900</Frequency>
        -->
        <UIPage ID="System.UIPage.PerformanceCounterPage"
            Accessibility="Public">
            <Implementation>
    <Assembly>Microsoft.Mom.UI.Components</Assembly>
            <Type>
Microsoft.EnterpriseManagement.Mom.Internal.UI.
            Modules.PerfCounterDataSource
            </Type>
        </Implementation>
    </UIPage>
    .
    .
    .
</UIPages>
```

The exemplary page in Table 1 above allows the user to pick a performance object, counter and instances, and then outputs that information.

The page set contains a collection of page references and an output transform that transforms an output of the pages into the form that is consumed by the type which the page set is assigned to. Table 2 below shows a sample of how a page set is defined using page references.

TABLE 2

```
<UIPages>
    <!-- UI page that allows the user to pick a WMI
namespace, class,
        properties of the class and the frequency on
which to probe
        WMI.
        Inputs: <ShowFrequency>false</ShowFreqency>
(Optional, if not
                specified the frequency controls and
value will be
                shown, if false, only the WMI Query
tags will be read
                and generated on update).
        Output Sample:
            <NameSpace>root\cimv2</NameSpace>
            <Query>select * from
Win32_Service</Query>
            <Params>
<Param>Param1</Param><Param>Param2</Param>
            </Params>
            <Frequency>900</Frequency>
        -->
    <UIPage ID="System.UIPage.WMIQueryProviderPage"
            Accessibility="Public">
        <Implementation>
<Assembly>Microsoft.Mom.UI.Components</Assembly>
            <Type>Microsoft.EnterpriseManagement.Mom.
                Internal.UI.Modules.WMIDataSource
            </Type>
        </Implementation>
    </UIPage>
    .
    .
    .
</UIPages>
<UIPageSets>
    <!-- UI page set for
System.Windows.Windows.WmiQueryProvider module
        type
    -->
    <UIPageSet
ID="System.UIPageSet.Modules.Windows.WMIQueryProvider"
TypeDefinitionID="System.Windows.WmiQueryProvider">
        <UIPageReferences>
            <UIPageReference
ID="System.UIPageSet.Modules.Windows.
WmiQueryProvider.Reference1"
                    PageID="System.UIPage.
WMIQueryProviderPage">
                <InputParameters/>
                <InputTransform/>
            </UIPageReference>
        </UIPageReferences>
        <OutputTransform/>
    </UIPageSet>
    <UIPageSet
ID="System.UIPageSet.Modules.Windows.WMIQueryProbe"
TypeDefinitionID="System.Windows.WmiQueryProbe">
        <UIPageReferences>
            <UIPageReference
ID="System.UIPageSet.Modules.Windows.
WmiQueryProbe.Reference1"
PageID="System.UIPage.WMIQueryProviderPage">
                <InputParameters>
                    <ShowFrequency>false</ShowFrequency>
                </InputParameters>
                <InputTransform/>
            </UIPageReference>
        </UIPageReferences>
```

TABLE 2-continued

```
        <OutputTransform>
            <xsl:stylesheet version="1.0"
xmlns:xsl="http://www.w3.org/1999/XSL/Transform">
                <xsl:output method="xml" indent="yes"
omit-xml -
declaration="yes"/>
                <xsl:template match="/">
                    <xsl:copy-of select="/NameSpace"/>
                    <xsl:copy-of select="/Query"/>
                    <xsl:copy-of select="/Params"/>
                </xsl:template>
            </xsl:stylesheet>
        </OutputTransform>
    </UIPageSet>
</UIPageSets>
```

Next, a management pack is generated, or an existing management pack is modified, such that it includes the new template and corresponding assembly (corresponding UI page set). Alternatively, the MP definition and assemblies can be delivered via another mechanism such as an installation package installed on the computer the user is using. The important thing is that they are delivered in some way, and likely they are delivered together. This is indicated by block 604 in FIG. 5.

Then, the management pack is distributed to the machines which have an operation monitoring system (e.g., the wizard and programmability layer as discussed above) and where monitoring is to be done. This can be done in a variety of ways such as importing it to a database and having it pulled by the proper computers. This is indicated by block 606 in FIG. 5.

When the distributed management pack is imported into the database, the new template is added to a list of available templates, along with its references to the UI assemblies. This allows the new template to be selected by the user. In other words, when the user invokes the configuration wizard 202, the wizard 202 queries the database to get the list of available templates. Then a display corresponding to the new template will be displayed in the template display screen 352 shown in FIG. 3B, such that the new template can be selected by the user. This is indicated by block 608 in FIG. 5.

When the new template is selected by the user, the configuration wizard 202 displays the configuration screens 354 based on the corresponding assembly (UI page set) 209. This is indicated by block 610 in FIG. 5. In other words, once the new template is selected by the user, the particular configuration UI page sets that are associated with that template are identified and shown to the user. Those page sets will be displayed as the configuration pages 354 shown in FIG. 3B.

Figure 6:
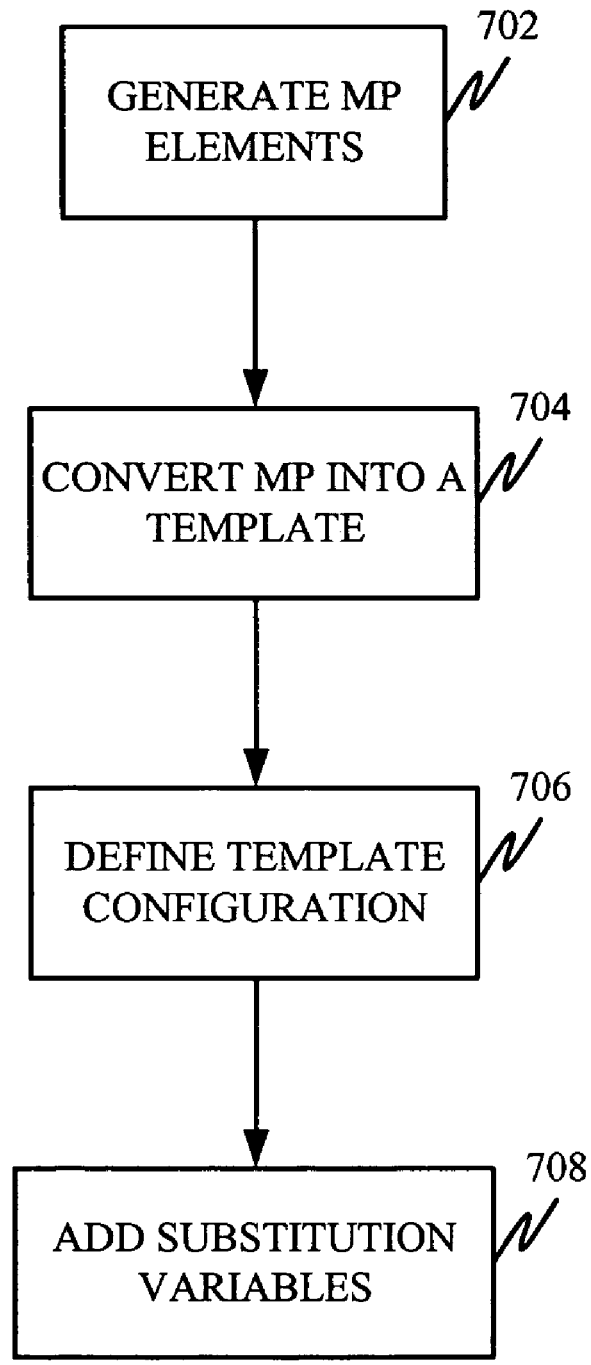
FIG. 6 is a flow diagram illustrating how templates are authored for distribution in accordance with one embodiment.

FIG. 6 is a flow diagram better illustrating how to generate a template definition as illustrated by block 600 in FIG. 5. First, the author generates the management pack elements (such as the classes, monitors, and rules) used by the template. This can be done is a similar way to generating any other management pack. For instance, Table 3 shows an exemplary management pack which contains very little information (a single class) but is designed to simply illustrate the basic principles discussed herein.

TABLE 3

```
<ManagementPack
xmlns:xsd="http://www.w3.org/2001/XMLSchema"
xmlns:xsi="http://www.w3.org/2001/XMLSchema-
instance">
    <Manifest>
        <Identity>
            <ID>System.Windows.Service.Template</ID>
```

TABLE 3-continued

```
            <Version>6.0.0.0</Version>
            <PublicKeyToken>31bf3856ad364e35</PublicKeyToken>
        </Identity>
        <Name>Micorosft Windows Service Template Management Pack</Name>
        <References>
            <Reference Alias="Windows">
                <ID>System.Windows.MP</ID>
                <Version>6.0.0.0</Version>
                <PublicKeyToken>31bf3856ad364e35</PublicKeyToken>
            </Reference>
        </References>
    </Manifest>
    <TypeDefinitions>
        <EntityTypes>
            <ClassTypes>
                <ClassType ID="SomeClassid" Abstract="false" Accessibility="Public" Hosted="true" Base="Windows!System.Windows.OwnProcessNTService"/>
            </ClassTypes>
        </EntityTypes>
    </TypeDefinitions>
</ManagementPack>
```

Generating the management pack elements is indicated by block 702 in FIG. 6.

In one embodiment, the author 510 then creates a template with an identifier that may be the same as the original management pack. In one embodiment, a valid template definition includes an empty configuration element, one reference for each reference that was defined in the original management pack, and a new reference called a self reference that is used by the template to define a reference to the management pack that contains it. This may not be required and can be removed if not used by the template author. The definition also illustratively includes an implementation section that contains the entire management pack that the template was created from. For example, the management pack illustrated in Table 3 above would generate the following template shown in Table 4.

TABLE 4

```
<Template ID="System.Windows.Service.Template">
    <Configuration>
    </Configuration>
    <References>
        <Reference ID="Windows"/>
        <Reference ID="Self"/>
    </References>
    <Implementation>
        <TypeDefinitions>
            <EntityTypes>
                <ClassTypes>
                    <ClassType ID="SomeClassid" Abstract="false" Accessibility="Public" Hosted="true" Base="Windows!System.Windows.OwnProcessNTService"/>
                </ClassTypes>
                <RelationshipTypes/>
            </EntityTypes>
        </TypeDefinitions>
    </Implementation>
</Template>
```

Converting the original management pack into a template is indicated by block 704 in FIG. 6. In another embodiment, the template is simply one part of a management pack.

Next, author 510 defines the template configuration that is required. Initially, in the present example, assume that the author wishes the user to provide two configuration elements as configuration information 226 (in FIG. 2). In that case, the author can enter a configuration section as illustrated below in Table 5.

TABLE 5

```
<Template ID="System.Windows.Service.Template">
    <Configuration>
        <xsd:element name="Namespace" type="xsd:string"/>
        <xsd:element name="TypeName" type="xsd:string"/>
    </Configuration>
    <References>
        <Reference ID="Windows"/>
        <Reference ID="Self"/>
    </References>
    <Implementation>
        <TypeDefinitions>
            <EntityTypes>
                <ClassTypes>
                    <ClassType ID="SomeClassid" Abstract="false" Accessibility="Public" Hosted="true" Base="Windows!System.Windows.OwnProcessNTService"/>
                </ClassTypes>
                <RelationshipTypes/>
            </EntityTypes>
        </TypeDefinitions>
    </Implementation>
</Template>
```

Defining the template configuration is indicated by block 706 in FIG. 6.

Finally, the author adds substitution variables. In doing this, the author defines substitution strings for configuration items and references. These can be anywhere in the implementation section and can be facilitated by, for instance, providing a right click context menu showing configuration elements and references that can be inserted. In this simple example being discussed, the author uses the two configuration variables for the class name and uses one of the references in the base class. This is shown in Table 6 below.

TABLE 6

```
<Template ID="System.Windows.Service.Template">
    <Configuration>
        <xsd:element name="Namespace" type="xsd:string"/>
        <xsd:element name="TypeName" type="xsd:string"/>
    </Configuration>
    <References>
        <Reference ID="Self"/>
        <Reference ID="System"/>
        <Reference ID="Windows"/>
        <Reference ID="Mom"/>
    </References>
    <Implementation>
        <TypeDefinitions>
            <EntityTypes>
                <ClassTypes>
                    <ClassType ID="$Config/Namespace$.$Config/TypeName$" Abstract="false" Accessibility="Public" Hosted="true" Base="$Reference/Self$System.Windows.OwnProcessNTService"/>
                </ClassTypes>
                <RelationshipTypes/>
            </EntityTypes>
        </TypeDefinitions>
    </Implementation>
</Template>
```

Adding the substitution variables is indicated by block 708 in FIG. 6. The template definition is complete and the author illustratively tests the execution of this template.

The author then goes on to create the user interface page set for the newly created template. This was described above and may require new UI pages or may use existing UI pages.

Figure 7:
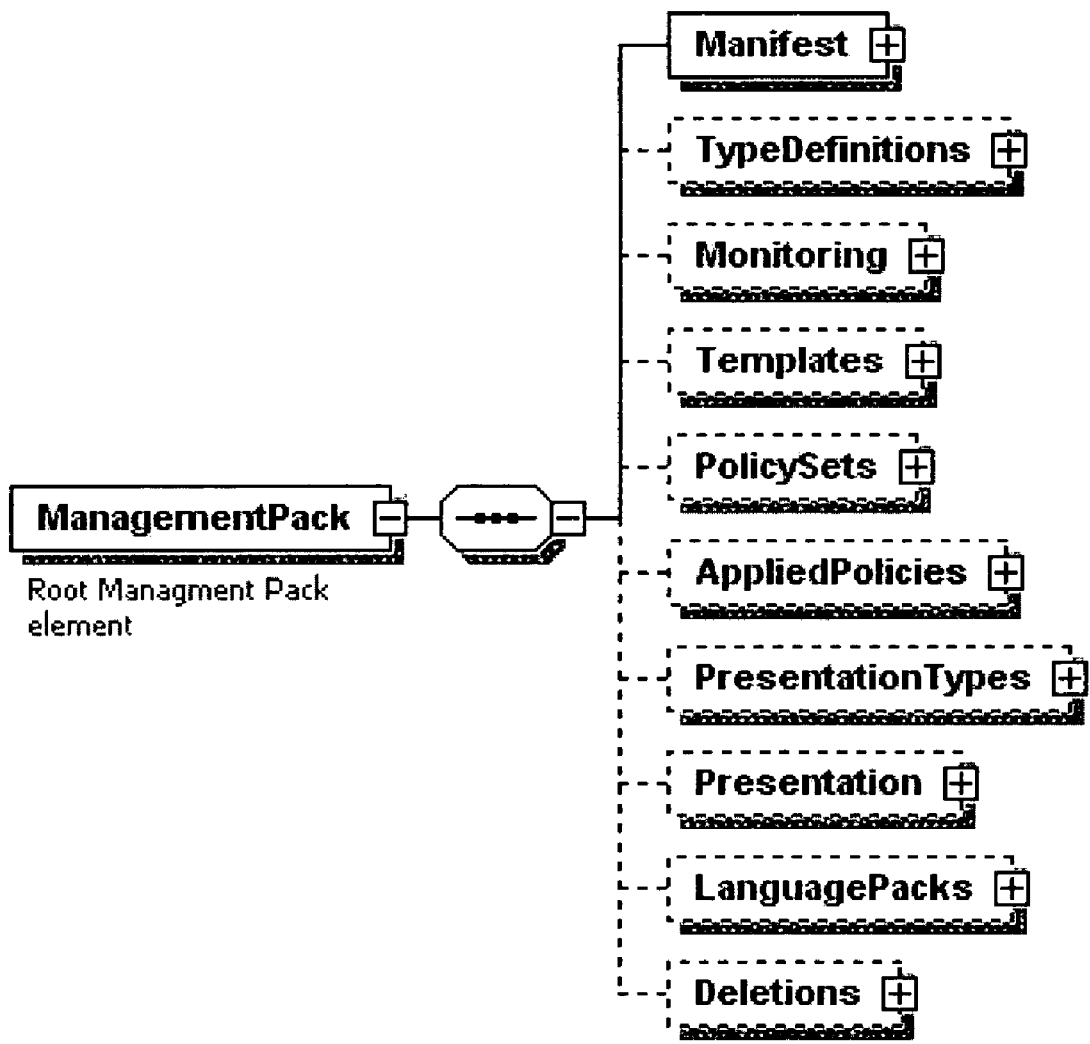
FIG. 7 illustrates an overall schema for a delivery mechanism for delivering templates to monitoring systems.

The overall schema of a management pack is illustrated in FIG. 7. It will be noted that, since the present discussion deals with adding templates to a management pack, only the template section will be discussed herein. FIG. 7 simply illustrates where, in one exemplary schema, the templates can be fit into a management pack. It can be seen that with this schema, the template is defined in the management pack that it ships with and all required types and objects that are required by the template are included in the same management pack or referenced management packs. UI components are provided as assemblies with the management pack and references to these assemblies are included in the management pack.

FIGS. 7A-7E illustrate a schema for defining templates, and FIGS. 8A-8J illustrate a schema for defining UI page sets.

Figure 7A:
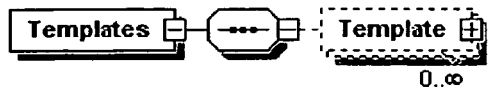
FIGS. 7A-7E illustrate a schema for templates.
Figure 7B:
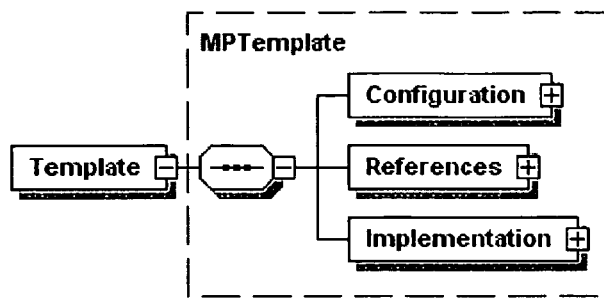

The template section of the management pack includes one or more templates as shown in FIG. 7A. Each template requires a configuration, references and implementation section as shown in FIG. 7B. The template illustratively has two attributes. The first is an ID which represents an internal identifier for this type, and the identifier is unique in the name space of the management pack. The second is an optional comment which is a comment field for use by the management pack author.

Figure 7C:
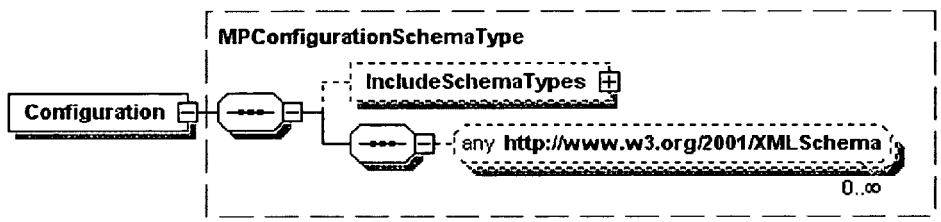
Figure 7D:
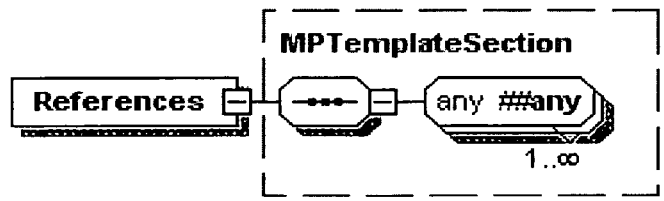

The configuration section defines the configuration items that must be set in order to run the template. This is illustrated in FIG. 7C.

The reference section illustratively contains reference information that is included in the management pack, that the output is stored in, after running the template. This is better illustrated by FIG. 7D. Actual references are defined in the management pack that contains the template prior to being used. One template-specific reference that is not defined in the management pack is the self reference described above.

Figure 7E:
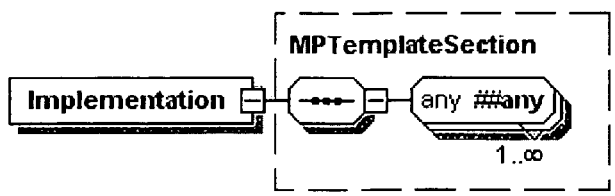

The implementation section contains a management pack fragment. This is the template that will create the management pack fragment after running the template. This section generally follows the management pack schema definition, but a difference is that the configuration from the template is used to populate object names as well as to configure management pack objects. The schema is shown in FIG. 7E.

Figure 8A:
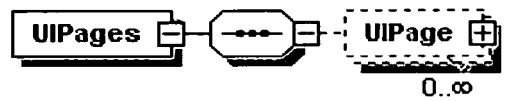
FIGS. 8A-8J illustrate a schema for UI page displays.

AS briefly discussed above, the management pack can contain zero or more reusable UI page definitions. Each UI page is defined in the UI pages section as shown in FIG. 8A. Each UI page has three attributes the first is an identifier attribute which is a unique identifier in the management pack name space for this UI page. The second is an optional comment field for use by the management pack author, and the third is an accessibility attribute that determines whether this UI page can be referenced by UI page sets in another management pack.

Figure 8B:
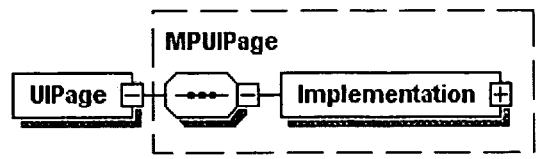
Figure 8C:
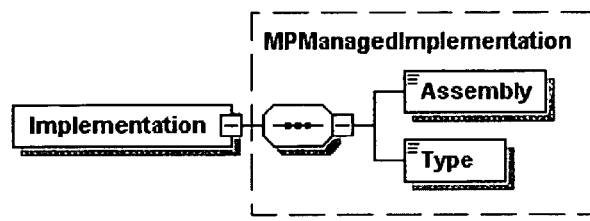

Each UI page requires an implementation section. The schema for this is illustrated in FIG. 8B. This implementation section contains assembly and type information that defines the page. This is illustrated in FIG. 8C.

Figure 8D:
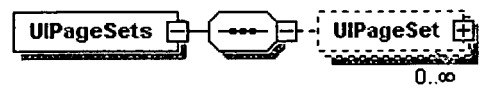

UI page sets are used to group together sets of UI pages defined in the same management pack or reference management pack. The page set describes the UI that will be shown for a template. The UI page sets section includes zero or more UI page sets as shown in FIG. 8D. Each page set has three attributes, the first of which is an identifier, the second of which is an optional comment field, and the third of which is a type definition identifier which identifies the type that this page set targets.

Figure 8E:
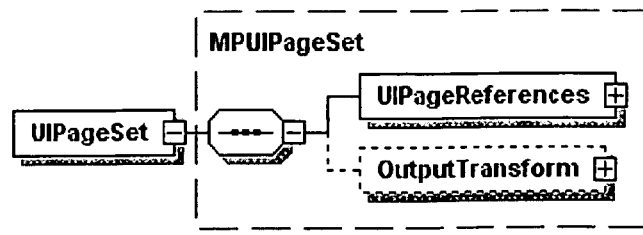
Figure 8F:
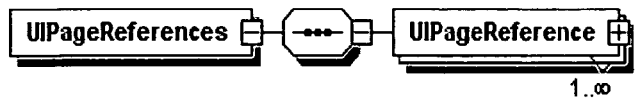

The page set has a set of references to UI pages and optionally an output transform as indicated by FIG. 8E. The UI page references element contains one-to-many UI page references that have been defined previously. This is indicated by FIG. 8F. Each UI page reference has two attributes including an identifier attribute and a type identifier attribute. The type identifier attribute is a reference to a UI page already defined in this management pack or a reference management pack.

Figure 8G:
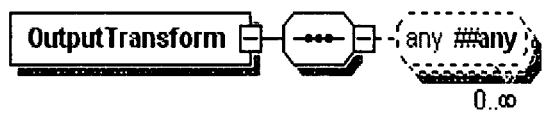

The page set places the output of each page together in the order they are shown to create the configuration output for the template. Optionally, if an output transform is specified, the transform is applied to the output configuration before it is submitted. This transform can be specified in the output transform element of the UI page set as shown in FIG. 8G.

Figure 8H:
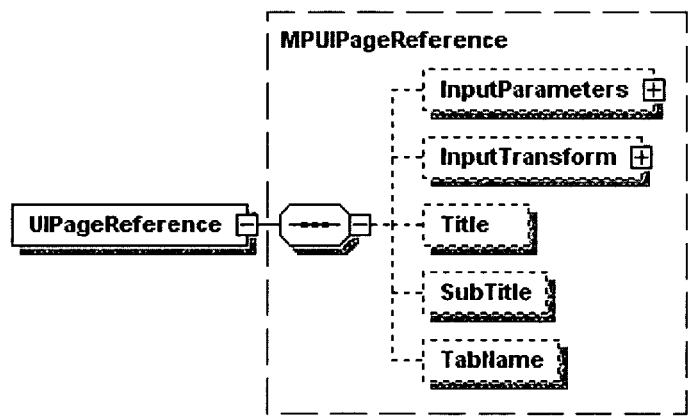

A UI page reference within the UI page set has the schema illustrated in FIG. 8H. The title and subtitle control the display of the page in the UI. These are internal names and can be referenced in the language pack sections for friendly, localized text. The tab name controls the name of the tab that this name will appear on when displayed in a tab control. In that case, the title and subtitle may not be used. The page set definition need not have any knowledge of how it will be displayed in the UI (such as in a wizard page or tab page).

Figure 8I:
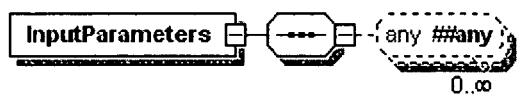

A page can optionally take input parameters. These parameters are used by the page implementation as required. Input parameters can be any known configuration such as XML as illustrated in FIG. 8I.

Figure 8J:
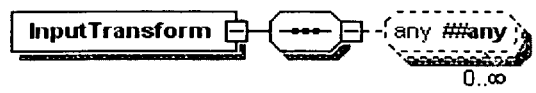

A UI page takes the configuration of a target object as an input. For instance, when the properties of a template is opened, the configuration of that template is passed to each page. A page may be interested in only part of this configuration so it is possible to apply a transform to this configuration so that only the required configuration is used by the page. This optional transform is specified in the input transform element of the page reference as shown in FIG. 8J.

It can be seen that the present system provides templates enable a user to quickly configure monitoring functions for even customized solutions or services. The system is also extensible so that new templates and corresponding assemblies (or user interface displays) can easily be defined and added to be monitor system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of configuring a computer-implemented monitor for monitoring a computer controlled service, comprising:

accessing a selected one of a plurality of monitoring templates based on a template selection input, each of the plurality of monitoring templates corresponding to a predefined group of services of a common service type, the predefined group of services being one of a plurality of groups of services that are grouped together based on having commonly monitored characteristics;

displaying, with a computer processing unit on a display, a set of user interface configuration display screens from a user interface assembly corresponding to the selected template, the user interface configuration display screens allowing the user to select which of a plurality of pre-defined monitor functions are to be performed on the service, the pre-defined monitoring functions being selectable by the user independent of identifying an instance of the service itself, the set of user interface configuration display screens including a template selection screen and a configuration screen, the template selection screen providing a list of available templates, the available templates including templates that correspond to an operating system service, an application, a website, a web service, a web application, a database application, and a distributed application, the template selection screen receiving a user selection of one of the available templates, the configuration screen receiving user selections of configuration information for pre-defined monitor functions associated with the user selected one of the available templates, at least one of the pre-defined monitor functions including a user selection of a threshold level;

receiving a configuration input indicative of user configuration of the selected template to reflect user selection of the pre-defined monitor functions, independent of identifying an instance of the service itself, through the set of user interface configuration display screens;

generating, with the computer processing unit, a service definition that defines what monitor functions are to be performed on the service based on the configuration input and the selected template;

outputting, with the computer processing unit, the service definition, to a program module comprising a programmability layer;

automatically instantiating monitors and configuring monitoring logic in the instantiated monitors, using the programmability layer, to perform the monitor functions defined by the service definition; and deploying the instantiated monitors with the configured monitoring logic to monitor the service.

2. The computer-implemented method of claim 1, wherein the computer-implemented method is deployed in a user environment, and further comprising:

prior to deploying the configured monitoring logic, identifying locations where the service is deployed in the user environment.

3. The computer-implemented method of claim 2 wherein the user environment comprises a plurality of computing systems each of which has a corresponding monitoring system and wherein identifying locations comprises:

sending a discovery rule to each of the computing systems, the discovery rule being executed by the monitoring systems to determine whether the corresponding computing systems have deployed the service.

4. The computer-implemented method of claim 2 and further comprising:

identifying individual instances of the service deployed in the user environment.

5. The computer-implemented method of claim 4 and further comprising:

deploying the configuration of desired monitoring, indicated by the service definition, to monitor the individual instances of the service at the identified locations.

6. The computer-implemented method of claim 1 and further comprising:

receiving the template selection input as being indicative of a service type to be monitored.

7. A service monitoring system, comprising:

a first plurality of monitoring configuration templates, each monitoring configuration template representing a set of pre-defined monitoring characteristics and functions common to a group of services of a pre-defined common service type, the pre-defined common service type being one of a plurality of different groups of pre-defined common service types, each group having commonly monitored characteristics and functions;

a plurality of sets of user interface displays, each set corresponding to one of the first plurality of monitoring configuration templates, and providing for user selection of the pre-defined monitoring characteristics and functions to be preformed;

a monitoring configuration component receiving the user selection of one of the first plurality of monitoring configuration templates and displaying the set of user interface displays corresponding to the selected monitoring configuration template;

wherein the monitoring configuration component receives configuration information as user inputs to the user interface displays and generates a service definition, based on the selected monitoring configuration template and the configuration information, indicative of desired monitoring functions and characteristics to be performed on a given service;

a monitoring programmability layer receiving the service definition and configuring monitoring logic for the given service based on the service definition;

a computer processing unit, being a functional component of the system, enabling the monitoring configuration component and the programmability layer to facilitate configuring the monitoring logic; and a management pack that is distributed to machines where monitoring is to be performed, the management pack including a template and a user interface page set, the template including a configuration section, a references section, and an implementation section, the configuration section defining configuration items that must be set in order to run the template, the reference section including reference information that is included in the management pack, the implementation section including a management pack fragment, and the user interface page set including an implementation section that has assembly information and type information.

8. The service monitoring system of claim 7 wherein, after the service monitoring system is deployed at a site, the monitoring configuration component receives, from a distribution mechanism, additional monitoring configuration templates, in addition to the first plurality of monitoring configuration templates, and corresponding sets of user interface displays, and displays the additional monitoring configuration templates for selection by the user.

9. The service monitoring system of claim 7 wherein the monitoring programmability layer deploys the configured monitoring logic to monitor the given service.

10. The service monitoring system of claim 9 wherein the monitoring programmability layer identifies individual instances of the given service employed in a user environment and deploys the configured monitoring logic to monitor each instance of the given service.

11. A computer-implemented method of configuring a computer-implemented monitor for monitoring a computer controlled service, comprising:

accessing a selected one of a plurality of monitoring templates based on a template selection input, each of the plurality of monitoring templates corresponding to a predefined group of services of a common service type, the predefined group of services being one of a plurality of groups of services that are grouped together based on having commonly monitored characteristics;

displaying, with a computer processing unit on a display, a set of user interface configuration display screens from a user interface assembly corresponding to the selected template, the user interface configuration display screens allowing the user to select which of a plurality of pre-defined monitor functions are to be performed on the service, the pre-defined monitoring functions being selectable by the user independent of identifying an instance of the service itself, the set of user interface configuration display screens including at least five screens, a first one of the at least five screens including a welcome display, a second one of the at least five screens including a template selection screen, a third one of the at least five screens including a configuration screen, a fourth one of the at least five screens including a service definition information screen, and a fifth one of the at least five screens including a final review screen;

receiving a configuration input indicative of user configuration of the selected template to reflect user selection of pre-defined monitor functions, independent of identifying an instance of the service itself, through the set of user interface configuration display screens;

generating, with the computer processing unit, a service definition that defines what monitor functions are to be performed on the service based on the configuration input and the selected template;

outputting, with the computer processing unit, the service definition, to a program module comprising a programmability layer;

automatically instantiating monitors and configuring monitoring logic in the instantiated monitors, using the programmability layer, to perform the monitor functions defined by the service definition; and deploying the instantiated monitors with the configured monitoring logic to monitor the service.

\* \* \* \* \*